(12) United States Patent
Funabashi et al.

(10) Patent No.: US 8,231,992 B2
(45) Date of Patent: Jul. 31, 2012

(54) LITHIUM BATTERY PACK

(75) Inventors: Kazuhiko Funabashi, Ibaraki (JP); Nobuhiro Takano, Ibaraki (JP); Takao Aradachi, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 334 days.

(21) Appl. No.: 12/090,693

(22) PCT Filed: Oct. 20, 2006

(86) PCT No.: PCT/JP2006/321454
§ 371 (c)(1),
(2), (4) Date: Apr. 10, 2009

(87) PCT Pub. No.: WO2007/046555
PCT Pub. Date: Apr. 26, 2007

(65) Prior Publication Data
US 2009/0305115 A1    Dec. 10, 2009

(30) Foreign Application Priority Data
Oct. 21, 2005  (JP) .............................. P2005-307395

(51) Int. Cl.
*H01M 10/48* (2006.01)
(52) U.S. Cl. ........................................ 429/61; 429/941
(58) Field of Classification Search .................. 429/61, 429/91, 65, 231.95; 361/1
See application file for complete search history.

(56) References Cited

U.S. PATENT DOCUMENTS

| | | | |
|---|---|---|---|
| 5,644,209 A | | 7/1997 | Chabbert et al. |
| 5,739,671 A | | 4/1998 | Hamada |
| 2003/0096158 A1 | * | 5/2003 | Takano et al. ................... 429/90 |
| 2006/0257723 A1 | * | 11/2006 | Tan et al. ......................... 429/65 |

FOREIGN PATENT DOCUMENTS

| | | |
|---|---|---|
| EP | 0498679 | 8/1992 |
| JP | 05064377 | 3/1993 |
| JP | 06133465 | 5/1994 |
| JP | 06141479 | 5/1994 |
| JP | 2001-025173 | 1/2001 |
| JP | 2003-208927 | 7/2003 |

OTHER PUBLICATIONS

Japanese Notification of Reason for Refusal, w/ English translation thereof, issued in Japanese Patent Application No. JP 2005-307395 dated May 24, 2011.

* cited by examiner

*Primary Examiner* — Jennifer Michener
*Assistant Examiner* — Monique Wills
(74) *Attorney, Agent, or Firm* — McDermott Will & Emery LLP

(57) ABSTRACT

For a lithium battery pack including battery cells the number of which is larger than the number of battery cells 111 that can be monitored by a voltage detect portion 115, there is disposed a temperature detect element 113 for detecting the temperatures of the battery cell 112 not monitored by the voltage detect portion 115, and, when the temperatures of the battery cell 112 detected by the temperature detect element 113 rise beyond a given value, there is issued a signal to stop the charging of the battery pack.

2 Claims, 2 Drawing Sheets

LITHIUM BATTERY PACK

TECHNICAL FIELD

The present invention relates to a lithium battery pack such as a lithium ion secondary battery.

BACKGROUND ART

In a cordless power tool, it has been demanded that a battery functioning as a power supply should be increased in capacity and be reduced in weight; and, to meet this demand, recently, there has been expected and gradually employed a lithium battery which is high in power density.

In the lithium battery, when it is overcharged or over-discharged, there is a fear that the lithium battery can be deteriorated or can ignite. In view of this, there is provided a protection IC for monitoring the overcharging and over-discharging of the respective cells included in the battery pack. Specifically, when the battery voltage of each battery cell is equal to or higher than a first given voltage value or equal to or lower than a second given voltage value, the protection IC outputs a detect signal and, based on the detect signal, a charging and discharging path is cut off to thereby secure a safety measure for the battery, that is, the overcharging or over-discharging of the battery can be prevented (see JP-A-6-141479).

DISCLOSURE OF INVENTION

The above-mentioned protection IC is a general-purpose product on sale and, generally, the number of battery cells to be detected by the protection IC is specified. When the number of battery cells included in a battery pack is larger than the number of battery cells that can be detected by the voltage detect portion of the protection IC, the voltages of battery cells cannot be partly detected. The protection function of the protection IC is not perfect.

In order to detect the voltages of the battery cells that cannot be detected by the protection IC, it is possible to mount a new protection IC for one or two battery cells to thereby detect the voltage(s) of such battery cell (s). However, since a protection IC itself is expensive, it is not so expedient to employ a new protection IC.

Also, there are some problems: for example, a protection circuit can be complicated due to differences in specifications between protection ICs (such as differences in detect voltages between battery cells and differences in consumed currents between protection ICs) and due to differences in reference voltages (ground voltages) between protection ICs.

It is an object of the invention to provide an inexpensive lithium battery pack which can eliminate the above-mentioned drawbacks and can prevent the battery cells against damage caused by at least overcharging.

According to an aspect of the invention, there is provided a lithium battery pack comprising: a plurality of lithium battery cells; a protection unit including a voltage detect portion that detects voltages of the respective lithium battery cells; and a temperature detect element for detecting temperature of lithium battery cells that can not be detected by the voltage detect portion. A number of the plurality lithium battery cells is larger than a number of lithium battery cells that can be monitored by the voltage detect portion. In other words, the aspect of the invention directs its attention to the following fact: there is a fear that such battery pack can ignite due to overcharging, whereas, for over-discharging, there is a fear that the life of the battery pack can be shortened but there is little fear that the battery pack can ignite. Thus, the invention aims at being able to prevent the battery pack against damage at least when it is overcharged.

According to the above-aspect, the battery cells that cannot be monitored by the protection unit can be monitored by the battery temperature detect element and, therefore, it is possible to provide a lithium battery pack at a low cost which can prevent the battery cells against damage caused by overcharging.

DESCRIPTION OF THE EMBODIMENTS

Figure 1:
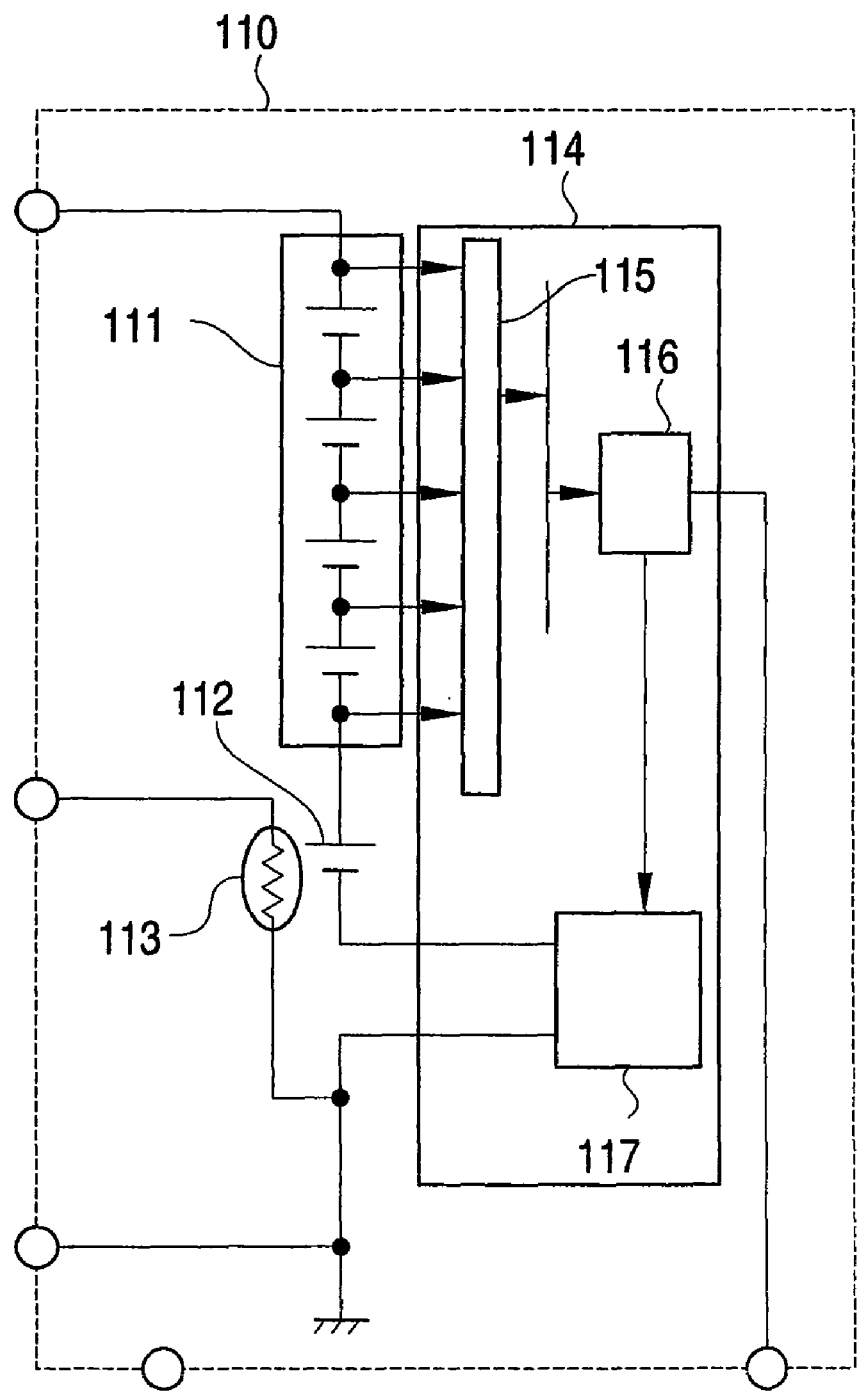
FIG. 1 is a block circuit diagram a battery pack according to an embodiment of the invention.

Now, FIG. 1 is a block diagram of an embodiment of a lithium battery pack 110. The lithium battery pack 110 is composed of, for example, five lithium battery cells (which are hereinafter referred to as battery cells simply) 111, 112, a protection IC 114, a battery temperature detect element 113 composed of, for example, a thermistor, and the like.

The protection IC 114 is composed of four battery voltage detect portions 115 respectively for detecting the terminal voltages of four battery cells 111, an output portion 116 for receiving the detect voltages of the battery voltage detection portions 115 and, when the detect voltages are not within a predetermined range, for issuing output signals, and a switching element 117, in response to the output of the output portion 116, for breaking the circuits of the battery cells 111, 112.

The battery temperature detect element 113 is mounted on the battery cell 112 the terminal voltage of which is not monitored by the battery voltage detect portion 115, while the element 113 is used to detect the temperature of the battery cell 112.

According to the battery pack 110 of the embodiment, the terminal voltages of the battery cells 111 are detected by the battery voltage detect portions 115 and, when the thus detected terminal voltages are not within a predetermined range, the switching element 117 is opened through the output portion 116, thereby being able to prevent the overcharging and over-discharging of the battery cells. Also, owing to the signal of the output portion 116, charging circuit opening and closing unit 8 is opened through the control unit 2 of a charger (which will be discussed later) to cut off the charging circuit thereof, thereby being able to prevent the battery cells from being overcharged. Further, when the battery temperature of the battery cell 112 are equal to or higher than a given value, the charging circuit is opened as will be discussed later, which can prevent the battery cell 112 from being overcharged.

Figure 2:
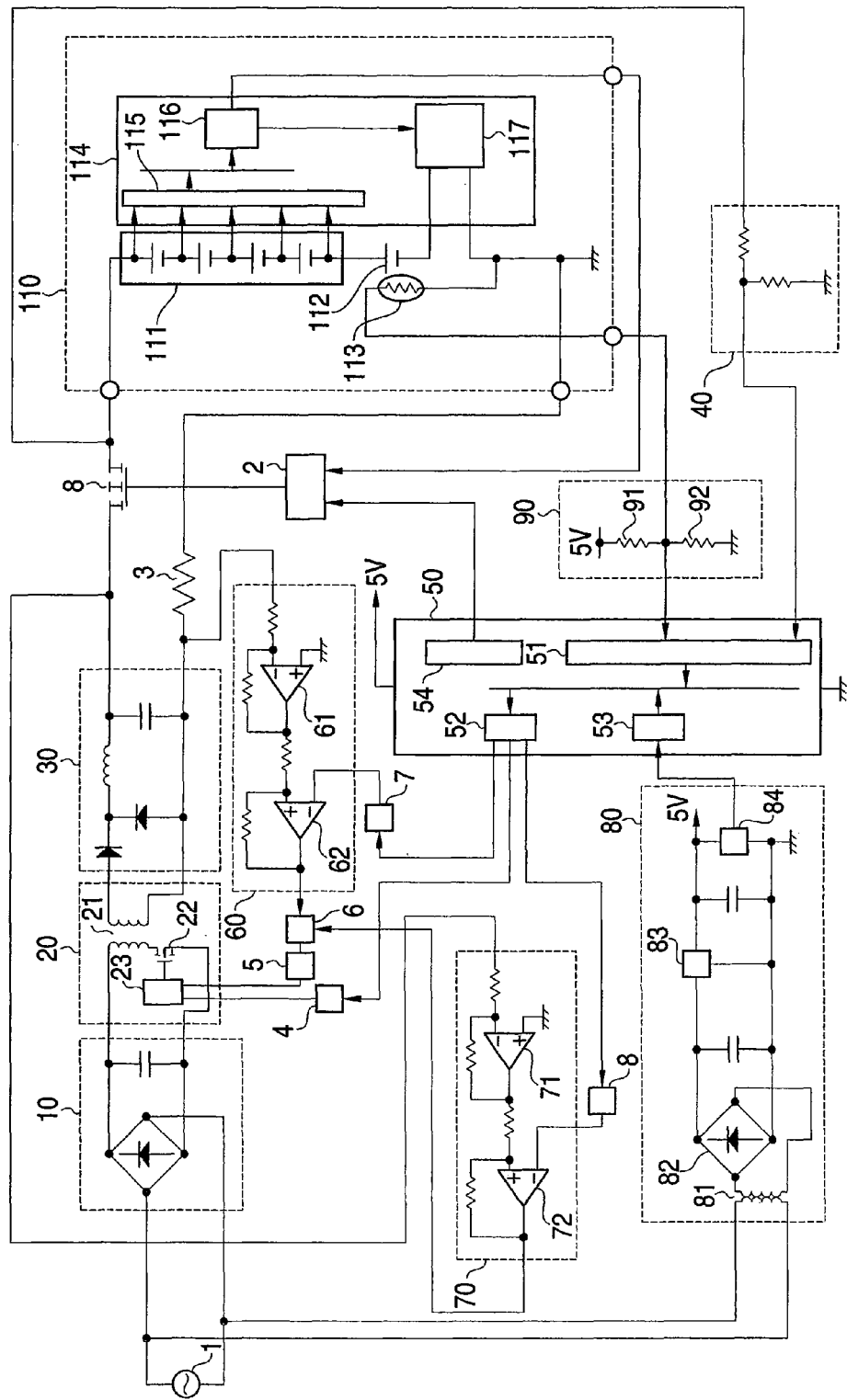
FIG. 2 is a block circuit diagram of an example of a charger to which a battery pack according to the embodiment is connected.

Now, FIG. 2 is a block diagram of an example of a charger to which the battery pack 110 of the embodiment is connected. The charger, as known well, comprises a first rectifier portion 10, a switching circuit 20, a second rectifier portion 30, charging circuit opening and closing unit 8 connected between the second rectifier portion 30 and battery pack 110, a charging current detecting resistor 3 for detecting a charging current flowing in the battery pack 110, battery voltage detect unit 40, a microcomputer 50, charging current control unit 60, output voltage control unit 70 for controlling the output voltage of the second rectifier portion 30, battery temperature detect unit 90, reference voltage generating unit 80 for generating a drive power to drive the battery voltage detect unit 40, the microcomputer 50, charging current control unit 60, output voltage control unit 70, and battery temperature detect unit 90, and the like.

The switching circuit 20 is composed of a high frequency transformer 21, an FET 22, a PWM control IC 23 for issuing a gate signal for the FET 22, and the like. And, the PWM control IC 23 can be driven by charging control signal transmission unit 4 and charging current and output voltage control signal transmission unit 5 (both of which will be discussed later).

The microcomputer 50 is composed of a CPU (not shown), a ROM (not shown), a RAM (not shown), an input port 51, two output ports 52, 54, a reset input port 53 and the like. From the output port 52, there can be issued through the charging control signal transmission unit 4 a signal which can start or stop the driving of the PWM control IC 23. From the output port 54, there is issued through control unit 2 composed of, for example, a transistor, a signal which can open and close the charging circuit opening and closing unit 8.

The battery voltage detect unit 40 is composed of two resistors which are used to divide the battery voltage of the battery pack 110, while the output voltage of the battery voltage detect unit 40 is input to the input port 51. The microcomputer 50 recognizes from the input of the output voltage that the battery pack 110 has been connected; and thus, the microcomputer 50, using the output port 52, drives the switching circuit 20 through the charging control signal transmission unit 4 and PWM control IC 23 and, at the same time, using the output port 54, closes the charging circuit opening and closing unit 8 through the control unit 2, thereby starting the charging of the battery pack 110.

The charging current control unit 60 is composed of two operational amplifiers 61, 62 and the like and is used to control a charging current detected by the charging current detecting resistor 3 such that the detected charging current can coincide with a set charging current set by the microcomputer 50 and charging current setting unit 7. This unit 60 issues through switching unit 6 and charging current and output voltage control signal transmission unit 5 a feedback signal for controlling the driving of the PWM control IC 23.

The output voltage control unit 70 is composed of two operational amplifiers 71, 72 and the like and is used to control the output voltage of the second rectifier portion 30 to coincide with a set output voltage set by the microcomputer 50 and output voltage setting unit 8. This control unit 70 issues through the switching unit 6 and charging current and output voltage control signal transmission unit 5 a feedback signal for controlling the driving of the PWM control IC 23.

The lithium battery, as known well, is firstly charged at a constant current and is then charged at a constant voltage. Therefore, at the time of start of the charging of the battery pack 110, the charging current thereof is controlled to a constant current by the charging current control unit 60 and, after the terminal voltage of the battery pack 110 reaches a given value, the charging voltage is controlled to a constant voltage by the output voltage control unit 70. Which one of the signals of the charging current control unit 60 and output voltage control unit 70 is input to the charging current and output voltage control signal transmission unit 5 is selected by the switching unit 6.

The battery temperature detect unit 90 is composed of a voltage dividing resistor 91 and a voltage dividing resistor 92 connected in series to the voltage dividing resistor 91 and connected in parallel to a battery temperature detect element 113, while the battery temperature detect unit 90 inputs the terminal voltage of the voltage dividing resistor 92 to the input port 51 of the microcomputer 50 as the temperature information about the battery cell 112. When the input temperature data is out of a predetermined range, the microcomputer 50, using the output port 52, stops the operation of the switching circuit 20 through the charging control signal transmission 4 and PWM control IC 23 and, at the same time, using the output port 54, opens the charging circuit opening and closing unit 8 through the control unit 2 to thereby stop the charging of the battery pack 110. That is, as the charging advances, when the temperature of the battery pack 110 rises and becomes out of a predetermined range, the charging of the battery cell 112 can be stopped.

The reference voltage generating unit 80, as known well, is composed of a transformer 81, a rectifier bridge 82, a three-terminal regulator 83, a reset IC 84, a smoothing condenser, and the like. This unit 80, as described above, generates and supplies a drive power (5V) for driving the microcomputer 50 and the like.

In the battery pack 110 according to the above-mentioned embodiment, since, when the terminal voltages of the battery cells 111 are respectively out of a predetermined range, the protection IC 114 opens the switching element 117 through the output portion 116 to thereby cut off the charging and discharging circuit of the battery pack 110, the battery pack 110 can be prevented against damage which could be otherwise caused by overcharging or over-discharging. Also, when the temperature of the battery cell 112 not monitored by the protection IC 114 rises during charging and becomes out of a predetermined range, the charging is stopped by the detect output of the battery temperature detect element 113. This can prevent the battery pack 110 against damage which could be otherwise caused by overcharging. Since the battery temperature detect element 113 is a part which is generally inexpensive, there can be provided an inexpensive battery pack which can be prevented against damage caused by overcharging.

The invention claimed is:

1. A lithium battery pack comprising:
   at least five lithium battery cells;
   a protection IC including four voltage detect portions that are connected to four lithium battery cells, respectively, the four voltage detect portions for detecting the respective voltages of four lithium battery cells;
   a temperature detect element for detecting temperature of a lithium battery cell that can not be monitored by the four voltage detect portions,
   wherein the number of the plurality lithium battery cells is larger than the number of lithium battery cells that can be monitored by the voltage detect portion, and
   wherein if the temperature of the battery cell detected by the temperature detect element is equal to or higher than a given value, charging to the at least five lithium battery cells is stopped.

2. The lithium battery pack according to claim 1, further comprising:
   a switching element being connected in series to the lithium battery cells,
      wherein the switching element cuts off a connection to the lithium battery cells when the voltages of the lithium battery cells detected by the voltage detect portion are out of a predetermined range.

* * * * *